United States Patent [19]

Allebest et al.

[11] Patent Number: 4,644,515
[45] Date of Patent: Feb. 17, 1987

[54] INTERACTIVE MULTI-USER LASER DISC SYSTEM

[75] Inventors: Edward F. Allebest, Riverside; Parley E. Hansen, Sunnymead; George A. Walsh, Costa Mesa; Walter R. Maguire, Newport Beach, all of Calif.

[73] Assignee: Resolution Research, Inc., Costa Mesa, Calif.

[21] Appl. No.: 673,549

[22] Filed: Nov. 20, 1984

[51] Int. Cl.[4] ............................................. G11B 7/00
[52] U.S. Cl. ........................................ 369/32; 369/35; 369/34; 369/36; 360/98
[58] Field of Search .............. 206/444, 445; 369/30, 369/32, 35, 33, 111, 34, 36, 39, 75.1, 75.2, 76; 360/98, 97, 110, 78, 72.1, 105

[56] References Cited

U.S. PATENT DOCUMENTS 3,930,145 12/1975 Fort et al. ............................ 364/421
4,019,205 4/1977 Salmond et al. .................... 360/105

OTHER PUBLICATIONS

IVIS brochure, Digital Equipment Corporation, Optical Disk File Memory for Computer Use, Yoshito Tsunoda.
Lasers Enhance Mass Storage, by Bergheim and McGeever, 6/25/84, *InfoWorld*.
Interactive Video Disc Learning Systems, 11/83 High Technology.
Optical Document File System, Panasonic Industrial Company, Optical Disks Foreseen, News in Perspective *Datamation*, 6/1/84.

Primary Examiner—Robert L. Richardson
Attorney, Agent, or Firm—Stetina and Brunda

[57] ABSTRACT

An interactive plural head laser disc system is characterized by pairs of head arrays installed on both sides of one or more laser discs. The heads may be accessed by either multiple or single users to independently and simultaneously access a single disc or plurality of discs. Each head array includes a plurality of read heads formed on a substrate to be in registry with the tracks of data on the discs to enable the reading of all tracks simultaneously and independently.

8 Claims, 12 Drawing Figures

U.S. Patent  Feb. 17, 1987  Sheet 1 of 2  4,644,515
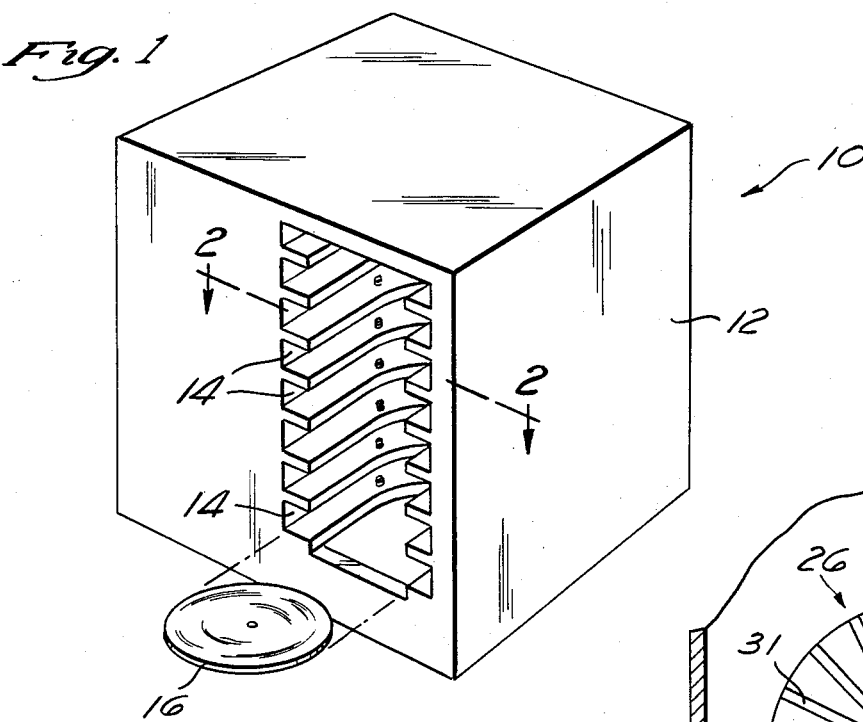
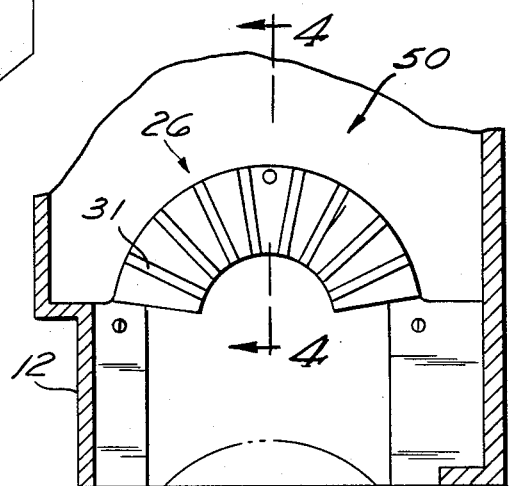
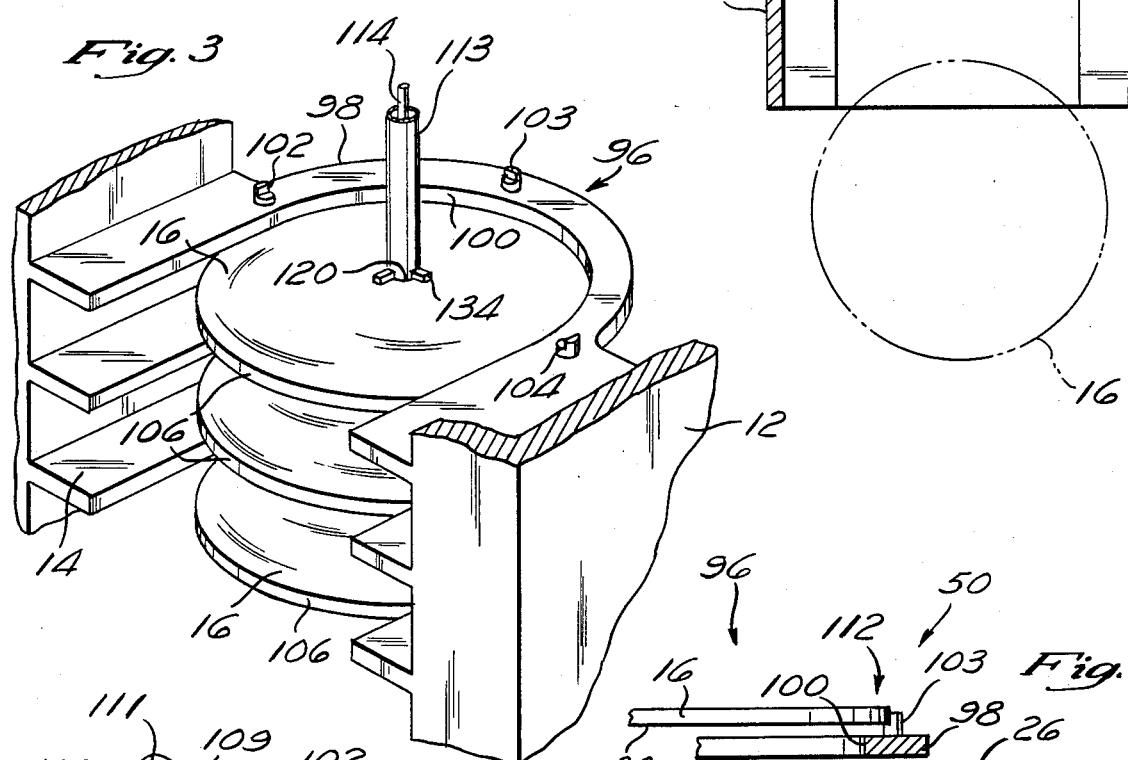
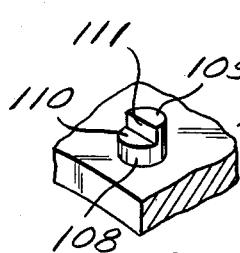
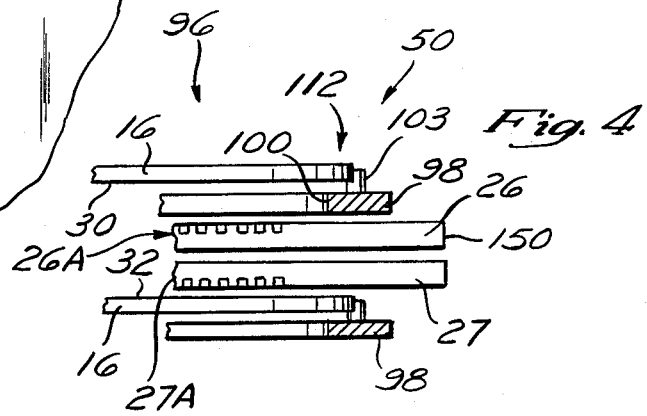

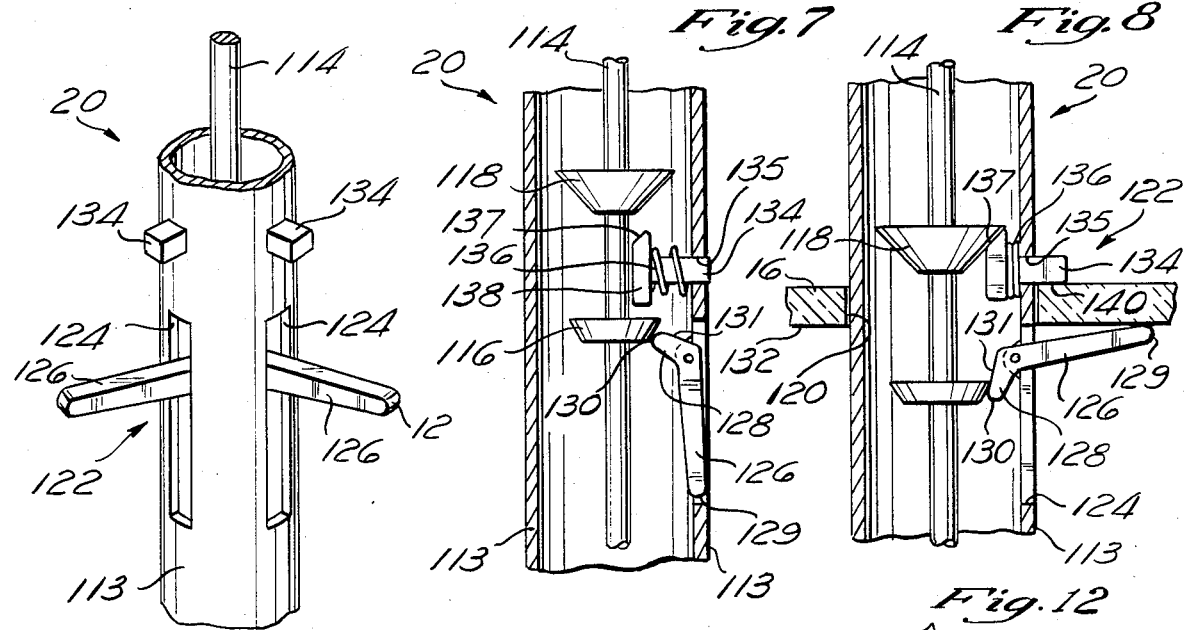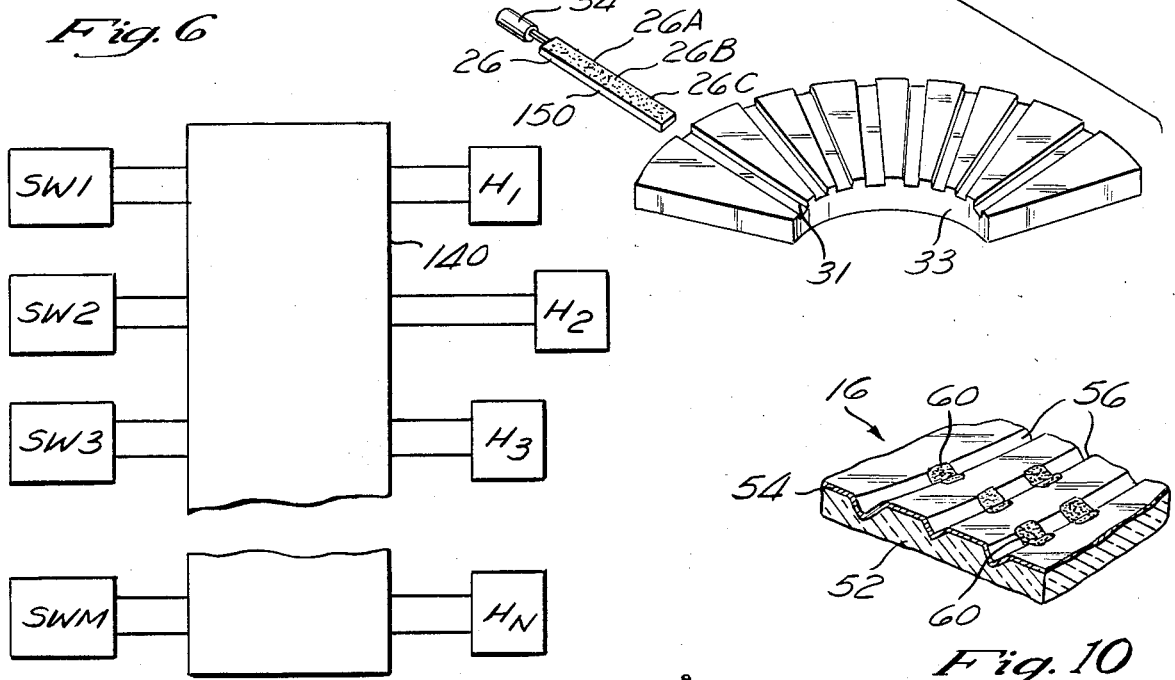

INTERACTIVE MULTI-USER LASER DISC SYSTEM

BACKGROUND OF THE INVENTION

This invention relates generally to laser disc digital data video storage systems and particularly to a laser disc digital and video storage system that permits a plurality of users to independently and simultaneously access a single laser disc and permits a user to access a plurality of discs.

The interactive video disc, or laser disc, which combines video images recorded on discs with random-access capability has become an important educational tool because it combines the potential of many teaching devices. Interactive video discs bring together the emotional power of television and the interactive power of the computer. The interactive video disc has had a major impact on education, training, information services, retail and entertainment. The interactive video disc makes possible a powerful educational experience in which computer based educational systems can display video imagery, real-time action, and stereo sound. Such learning systems allow interactive teaching, learner control of materials and minimal supervision. An interactive video disc can simulate reality, thereby providing an effective and inexpensive alternative to hands-on experience.

Currently, interactive video discs are used in industrial training, point of sale, retailing and entertainment. The key advantage of the interactive video disc system is their ability to respond to the user. Programs stored with the video disc require the viewer to play an active part in the presentation of materials. For example, if a student believes he knows a subject, he can take a test immediately instead of going through the lesson. Whenever the student answers the questions, the computer indicates whether the answers are correct and may direct the disc to go ahead or return to a previous lesson according to the student's score. Interactivity allows students greater freedom so that they may choose the order in which they study sections of a subject. By contrast, more traditional methods of training, such as live lectures, video tape and books are linear in that all the material is presented in the same order to every student. In watching video tapes and listening to lectures, the student is a passive observer, which is a less effective learning role than if the student were an active participant.

In order to make the student a more active participant, a programming technique known as branching creates alternative routes through a given set of materials. Branching lets student proceed at their own pace, see any materials they need or want to see, be tested on their comprehension of the materials and receive remedial work where needed.

Like the interactive video disc, micro computers are capable of branching, but presently they can not equal the sophistication of the video display which is made possible because the video disc stores more data than magnetic storage media ordinarily used in connection with microcomputers. More than 400,000 bits of information are required to create a single image on a television screen. A typical microcomputer disc holds up to 5 million bits, which is only enough information to store about 12 video images. At a standard video playback speed of 30 frames per second, an entire magnetic disc will hold only 0.4 seconds of real-time video. In addition, microcomputers construct screen displays too slowly to show real-time video. In contrast, a video disc can hold up to an hour of real-time video on each side. Hence, a video disc is less expensive than computer magnetic disk storage of video.

A disadvantage of present interactive video disc systems is that each user requires a separate video disc and disc drive in addition to a video monitor. There are many situations where it would be advantageous to provide access to a single video disc by multiple users or multiple video discs by multi-users. For example, in an archive, such as a library card catalog, it would be advantageous to have the entire archive stored upon a single disc, or a single set of discs for large archives, and have the archive available for independent access by plural users. In a product promotion display at a trade show, for example, it would be advantageous to provide a single video disc and disc drive and plural video monitors from which prospective customers could independently view and interact with material contained upon the disc or multiple discs.

SUMMARY OF THE INVENTION

The present invention provides an interactive video disc system which overcomes and alleviates the deficiencies of prior art systems. The video disc system of the invention provides a multi-user capability and permits a plurality of users to have simultaneous access to both surfaces of each of a plurality of video discs mounted in a single disc drive system. The system provides independent user access to all tracks on all surfaces of the discs mounted in the disc drive. The multi-disc system of the invention is constructed by stacking upon a common drive shaft, which gives great capacity to the storage system and provies quick access to all data or video images stored within the laser disc storage module.

A multiplicity of read head arrays are installed on both sides of each disc for each user station to allow materials on each side of the discs to be accessed without the necessity of turning the discs over, which effectively doubles the storage capacity of the system as compared to prior art devices. The read head arrays are formed in a substrate with one head corresponding to each track of the disc. A typical disc has 54,000 tracks; therefore, each head array includes 54,000 heads that are fixed in the substrate. The heads are independently accessible to read data stored on the discs.

The individual laser discs are removable and may be replaced by other laser discs. The invention includes a shaft having a spindle therein, which, when secured in place upon the shaft, actuates mechanisms for securing each disc to the shaft. The discs are located within slots in a housing and supported therein when the shaft is withdrawn to remove and replace a disc.

Each user station includes a selector panel or keyboard connected to a central processing unit. The output of the central processing unit is connected to a multiplexer that is also connected to each of the heads arrays. A user at each user station selects a particular disc and track by inputting information as by way of a keyboard or pre-programmed format, for example, corresponding to the disc and track number. The central processing unit converts the disc and track data to a binary word which contains a number of bits sufficient to provide information of a selected disc and track. The binary word address is input to the multiplexer, which outputs a signal to the head corresponding to the selected disc and track for reading information from the selected track. Since any user station has access to any disc and track, a particular user need only enter numbers on a keyboard corresponding to the desired disc and track in order to select a desired portion of the array of video discs.

BRIEF DESCRIPTION OF THE DRAWINGS

FIG. 1 is a perspective view of the invention showing a housing including a plurality of slots therein and a laser disc for insertion into one of the slots for removal therefrom;

FIG. 2 is a cross-sectional view about line 2—2 of FIG. 1 illustrating placement of a read head array within a slot;

FIG. 3 is a perspective view showing a plurality of laser discs mounted inside the slots to a shaft;

FIG. 4 is a cross-sectional view about line 4—4 of FIG. 2;

FIG. 5 is a perspective view of a pad included in FIG. 3 for supporting a laser disc when the shaft is removed from the housing;

FIG. 6 is a perspective view of the apparatus used to support the discs of FIG. 3 upon the shaft for rotation within the housing;

FIG. 7 is a cross-sectional view illustrating the support mechanisms of FIG. 6;

FIG. 8 is a cross-sectional view of the support mechanisms of FIG. 7 engaged with a laser disc to hold it in position for use;

FIG. 9 is a perspective view of a drive motor, a drive shaft and a laser disc;

FIG. 10 is a perspective view of a portion of a laser disc in an expanded scale showing the locations of dark spots formed thereon to store data; and FIG. 11 is a simplified block diagram of control circuitry for enabling a user to select a particular disc and track in a multi-disc drive system; and FIG. 12 is an exploded perspective view of the read head array of FIG. 2.

DESCRIPTION OF THE PREFERRED EMBODIMENT

Referring to FIG. 1, an interactive laser disc system 10 includes a housing 12 having a plurality of slots 14 therein for receiving a laser disc 16.

Referring to FIGS. 3 and 9, the interactive laser disc system 10 includes a drive motor 18 having an output disc drive shaft 20 to which the discs 16 are mounted. A plurality of video discs 16 are mounted to the disc drive shaft 20. As shown in FIG. 4, in the preferred embodiment, a multiplicity of read head arrays 26, 27 are associated with each of the discs 16 such that the read head arrays 26 and 27 face the lower side 30 and the upper side 32, respectively, of the discs 16. The read head arrays 26, 27 are preferaby slidably mounted in corresponding radial slots 31 in a support plate 33 as shown in FIGS. 2 and 12. A linear actuator 34, shown in FIG. 12, controls the radial position of the read head arrays 26 and 27.

Each disc 16 is formed to have information stored thereon for retrieval via an optical reading system designated generally by the numeral 50 in FIGS. 2 and 4. The typical disc 16 is about 30 mm in diameter and, as best shown in FIG. 10, comprises a substrate 52 having a recording layer 54 thereon formed for example, of Te-Se-Pb alloy. Vapor deposition techniques for depositing such alloys on substrates are well known in the art. The substrate 52 may be formed of glass having a plurality of groove 56 therein. Exposing the recording material to light from a suitable source of coherent light, such as a laser diode (not shown), forms a pit 60, which is a darkened area in the disc 16. A plurality of such pits 60 may be formed in the disc 16 in patterns that form digital signals that may be read by the read head arrays 26, 27.

Referring to FIG. 9, the video disc system 10 includes a motor 18 having a shaft 20 extending therefrom. The discs 16 are mounted to the shaft 20 to be rotatable by the motor 18 at a speed of about 1,800 rpm.

Referring to FIGS. 1-4, the video discs 16, the disc drive motor 18, the read head arrays 26, 27 are preferably mounted in the housing 12. The housing 12 also encloses electronic circuitry, shown schematically in FIG. 11, for providing selective access to any particular disc and track.

Referring to FIGS. 1-5, the discs 16 are preferably inserted into corresponding slots 14. Each slot includes a support structure 96, as best shown in FIGS. 3 and 4, which supports the discs 16 when the shaft 20 has been removed from the housing 12.

The support structure 96 includes a base 98 that may be formed to have an inner edge 100 that is an arc of a circle. Preferably, at least three pads 102-104 are mounted on the base 98 by a suitable adhesive. The pads 102-104 are preferably formed of a soft material such as rubber to preclude the possibility of scratching the discs 16 when they are supported by the base 98. The pads 102-104 are arranged so that a circular arc connecting them will be greater than 180 degrees. The discs 16 have generally uniform mass distributions and are positioned relative to the pads 102-104 such that releasing the discs 16 from the shaft 20 causes the outer edges 106 of the discs 16 to be supported by the pads 102-104 in each of the slots 14 so that the shaft 20 may be removed without causing the discs 16 to fall out of alignment.

FIG. 5 illustrates the pad 102 in a scale expanded from that of FIG. 3. The pad 102 may have a lower portion 108 that is substantially cylindrical and an upper portion 109 that is generally a portion of a cylinder. The lower and upper portions 108 and 109 join to form a shelf 110, upon which the disc 16 rests when the shaft 20 is not engaged therewith. The upper portion 109 has an edge 111 that forms a stop to limit the distance that the disc 16 can be inserted into the housing 12. The other pads 103 and 104 are formed similar to the pad 102 and include similar stops. The stops cooperate to place the central axis of the disc 16 in alignment with the shaft 20 when the disc 16 is fully inserted into the slot 14 so that the edge of the disc 16 rests upon the shelves 110 and abuts the stops.

FIGS. 3, 6 and 7 show structural features of the shaft 20. The shaft 20 includes a hollow tube 113 and a rod 114 having a pair of cams 116 and 118 that correspond to each slot 14 in the housing 12. The hollow tube 113 has an outer diameter sized to fit within a central aperture 120 of each video disc 16. The tube 113 has a plurality of support members 122 mounted in corresponding windows 124 for each of the slots 14. The tube 113 preferably has three support members 122 that are angularly spaced by about 120 degrees.

As best shown in FIG. 7, each of the support members 122 has a first arm 126 and a second arm 128 that extends at an angle away from the first arm 126. Each of the support members 122 is pivotally mounted by any suitable means, such as a pin 125 in the corresponding window 124 near the juncture of the first arm 126 and the second arm 128. The second arm 128 extends into the tube 113 for selectively contacting the cam 116 when the rod 114 is fully inserted in the tube 113. As shown in FIG. 7, the first arm has a tip 129 which extends into the hollow tube 113 when the tube is vertically oriented and the rod 114 is positioned so that there is no contact between the cam 116 and the second arm 126. The tip 129 is preferably tapered inwardly to facilitate sliding the tube 113 into the central aperture 120 in the disc 16.

As shown in FIG. 8, when the rod 114 is advanced into the tube 113, the cam 116 contacts an end 130 of the second arm 128, causing the support member to pivot so that the first arm rotates out of the window 124 to contact the lower surface 132 of the disc 16 to lift it relative to the tube 113. As the rod 114 continues to advance into the tube 113, the cam 116 slides over the end 130 to exert a force on an edge 131 of the second arm 128 to hold the disc 16 at a desired position above the pads 102–104 so that the disc 16 may fully rotate.

Referring to FIGS. 6–8, the tube 113 also includes a stabilizing member 134 corresponding to each support member 122. The stabilizing member 134 is positioned within a radial passage 135 in the tube 113 and is biased by a spring 136 to normally lie entirely in the tube 113 in a retracted position shown in FIG. 7. The stabilizing member 134 has a generally wedge-shaped cam 137 on an inner member 138. The cam 137 is positioned to contact the cam 118 when the cam 118 contacts the second arm 128 of the support member 122. Motion of the cam 118 into the tube 113, therefore, forces the stabilizing member 134 from the retracted position of FIG. 7 to a protruded position shown in FIG. 8 in which the stabilizing member 134 projects out of the passage 135 so that a lower surface 140 of the stabilizing member 134 contacts the upper surface of the disc 16 when the cam 116 and support member 122 have lifted the disc 16 off the pads 102–104. Therefore, insertion of the rod 114 into the tube 113 causes the disc 16 to be held securely between the support members 122 and the stabilizing members 134.

The outer end of the rod 114 may include a cap 146 have a threaded portion of engagement with a corresponding threaded portion on the tube 113 to retain the cams 116 and 118 urged against the support members 122 and the stabilizer members 134, respectively, to hold the discs 16 in position for use.

As shown in FIGS. 2 and 4, a plurality of read head arrays 26, 27 are positioned on opposite sides of each disc 16. The read head arrays are preferably formed as elongate rectangles and are arranged around approximately the same portions of the discs 16 as the pads 102—104. As best shown in FIGS. 2 and 12, the read head arrays 26, 27 each include a muliplicity of read head 26A, 26B, etc. for reading digital data stored on the disc 16. Each side of the disc 16 normally has approximately 54,000 tracks of data stored thereon. Therefore, on each side of the disc 16 there are 54,000 read heads arranged in registry with the track 56 (shown in FIG. 10). As shown in FIG. 12, the read head array 26A, for example, is formed on a substrate 150 by well known fabrication techniques. Drexler Industries of Mountain View, Calif. produces a read head array sold under the trademark Micro Bar that is suitable for forming the read head arrays 26, 27.

When a disc 16 is placed in the housing 12, the tracks of data may be slightly out of registry with the read heads of one or more read head arrays. Therefore, each read head array 26, 27 has a corresponding linear actuator 34 connected thereto for moving the arrays a radial distance of a few millimeter to obtain the desired alignment. Alignment is accomplished by addressing a particular read head and then moving the corresponding read head array until the addressed read head detects data on its corresponding track on the disc 16. Since all of the read heads on an array are fixed relative to one another, it is necessary to align only one head in each array.

FIG. 11 is a simplfied block diagram of the control and selection circuitry for use in selecting a read head corresponding to a particular disc and track. The system includes the central processing unit 140 (CPU) having plurality of CPU switches SW1, SW2 ... SWM with each CPU switch corresponding to a particular user station. The read head arrays 26, 27 are connected to the CPU 140. Each CPU switch is connected to a multiplex bus, which is connected to each of a plurality of read heads H1, H2, H3 ... HN. The control circuitry allows each of N users to activate the N read heads to access a particular disc 16 and track 56 thereon.

The length of the address word required to permit selection of a particular disc and track depends upon the number of discs in the system and the number of tracks on each disc. For example, if the system has a stack of ten discs with 54,000 tracks per side, then there must be twenty separate disc addresses and 54,000 separate track addresses. The addresses may conveniently be in the form of binary numbers. Since 20 is between $2^4 = 16$ and $2^5 = 32$, five bits are required to identify the selected disc. Similarly, since 54,000 is betewen $2^{15}$ and $2^{16}$, sixteen bits are required to identify each of the 54,000 tracks. Therefore, a twenty-one bit binary number is required to address a particular disc and track in a stack of twenty discs with 54,000 tracks per disc.

What is claimed is:

1. An optical disc data storage and retrieval system for reading information stored on a plurality of optical discs having a plurality of tracks on each side thereof for storing information, comprising:
   an optical disc drive shaft;
   means for mounting a plurality of optical discs to the disc drive shaft axially spaced apart along the length thereof, the disc drive shaft being selectively engageable with the discs such that the discs are rotatable with the disc drive shaft;
   a read head array positioned proximate each side of the discs for reading information stored thereon, each read array including a plurality of read heads arranged in correspondence with the plurality of tracks; and
   means for providing simultaneous access to each disc and track thereon independently of the other discs and tracks.

2. The system of claim 1 wherein the drive shaft and mounting means are mounted inside a housing having a plurality of slots therein, each slot being configured to receive a disc.

3. The system of claim 2 including support means for supporting the discs in the slots when the disc drive shaft is disengaged from the disc.

4. The system of claim 3 further including a plurality of shelves mounted inside the housing in registry with the slots for supporting the discs about peripheral portions thereof.

5. The system of claim 4 further including a plurality of stops mounted to each of the shelves such that placing the discs in the slots in abutment with each corresponding stop places the disc in alignment so that the disc drive shaft may be inserted therethrough.

6. The system of engaging claim 3 wherein the disc drive shaft includes means for selectively lifting each disc off the support means and engaging the discs for rotation with the disc drive shaft.

7. The system of claim 6 wherein the engaging means includes:

a rod inside the disc drive shaft; a first cam mounted to the rod for each disc location;

a second cam mounted to the rod for each disc location;

lifting means actuatable by the first cam for lifting each disc off its shelf; and stop means actuatable by the second cam for stopping motion of the discs so that each disc is retained between the lifting means and the stop means.

8. The system of claim 1 wherein each read head array includes:

a substrate; and a multiplicity of read heads formed on the substrate to be in registry with the tracks of data on the discs.

* * * * *